March 24, 1970  M. A. SCHULTZ  3,501,828

METHOD OF MANUFACTURING A TIE ROD ASSEMBLY

Filed Aug. 5, 1968

INVENTOR.
Melvin A. Schultz
BY
W. F. Wagner
ATTORNEY 3,501,828
METHOD OF MANUFACTURING A TIE ROD ASSEMBLY
Melvin A. Schultz, Bay City, Mich., assignor to General Motors Corporation, Detroit, Mich., a corporation of Delaware
Filed Aug. 5, 1968, Ser. No. 750,143
Int. Cl. B23p 17/00
U.S. Cl. 29—421        5 Claims

ABSTRACT OF THE DISCLOSURE

The method of making a threaded adjuster assembly involving disposition of a plurality of split nuts in aligned axially spaced relation on the threaded end of a rod, slidably positioning the nuts in a tubular member and electromagnetically deforming the member into gripping engagement with the nuts so that portions thereof exert a resilient bias providing full thread conformity and a predetermined turning torque and other portions thereof forming circumferential ribs retaining the nuts in their axially spaced relation.

---

This invention relates to self-locking adjustable threaded assemblies and to a simplified and improved method of manufacture thereof.

An object of the present invention is to provide an improved, simplified and economical tie rod adjuster assembly.

Another object is to provide an efficient and economical method of manufacture thereof.

A further object is to provide a method of manufacture enabling maintenance of a high degree of repetitive uniformity in precision fit and establishment of predetermined turning torque for such assemblies.

In prior art practice, tie rod assemblies have customarily utilized aligned rods having inner ends threadably disposed within an internally threaded split sleeve which retains the rod ends in assembled relation and enables precision adjustment of the overall length of the total assembly. In the past, however, such sleeves have commonly employed separate clamping means at each end utilized to contract the sleeve into gripping engagement with the threaded rod ends in a given angular position after adjustment of the overall length of the entire assembly. More recently, it has been proposed to employ a closed internally threaded tubular connector member which is preformed to a cross sectional configuration providing a constant resilient bias which resists angular displacement of the connector member until a predetermined high level of torque is applied thereto. However, in either case, the fabrication cost and assembly time involved are relatively high in that both types require formation of internal threads on the connector member exhibiting a high degree of precision mating engagement with the threaded ends of the rods. In the present invention, however, this requirement is totally eliminated by utilization of standard commercially available hex nuts which due to their widespread general application are relatively low in cost.

The foregoing and other objects, advantages and features of the invention will become more readily apparent as reference is had to the accompanying specification and drawings wherein.

Figure 1:
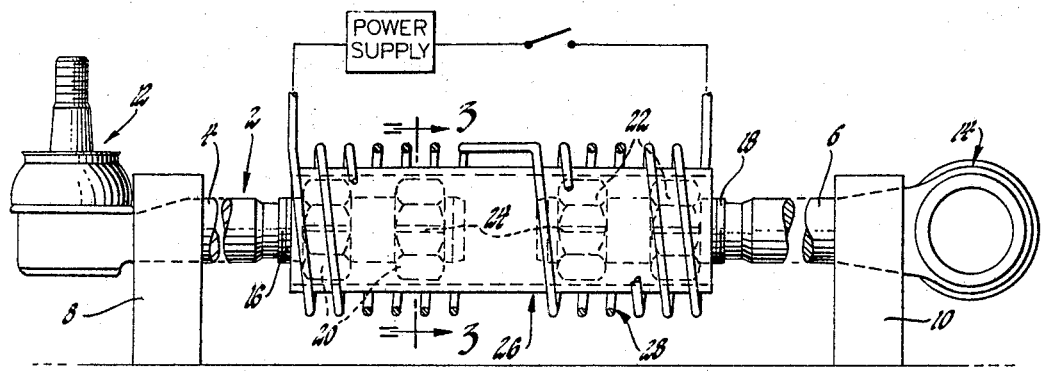
FIGURE 1 is a side elevational view of a tie rod assembly incorporating the features of the invention, together with apparatus for conducting the method of the invention.

Referring now to the drawings and particularly FIGURE 1, there is shown a semi-finished tie rod assembly 2 disposed in position on manufacturing apparatus utilized in completing the final manufacturing step thereof. Tie rod assembly 2 includes two aligned rod ends 4 and 6 supported on fixtures 8 and 10. In common with similar components conventionally employed in prior art tie rod assemblies, each rod end is formed at its outer extremity with a ball joint assembly 12 and 14, respectively, adapted for connection to associated portions of a vehicle steering linkage, not shown. The inner extremity of each rod end in turn is formed with threaded portions 16 and 18, respectively, of opposite lead, i.e., right and left hand threads. According to one feature of the invention, commercially available hex nuts 20 and 22 are utilized to effect threaded connection between the threaded portions 16 and 18 of rods 4 and 6 and a common tubular connector.

Figure 2:
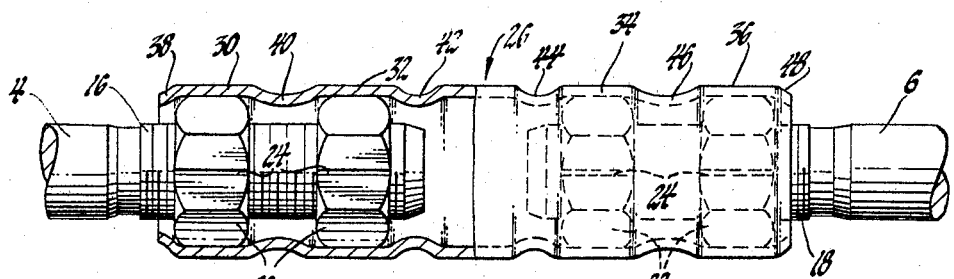
FIGURE 2 is an enlarged side elevational view of the adjuster portion of the tie rod assembly shown in FIGURE 1.
Figure 3:
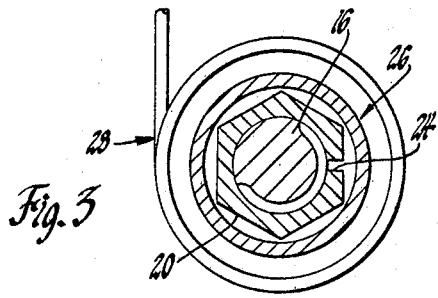
FIGURE 3 is a view looking in the direction of arrows 3—3 of FIGURE 1 illustrating the relationship of the parts prior to completion of the final method step.
Figure 5:
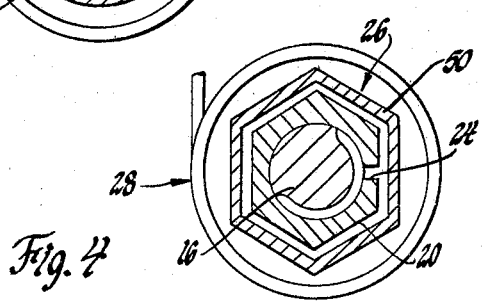
FIGURE 5 is a view similar to FIGURES 3 and 4 showing the relationship of the parts following the final method step.

To implement utilization of nuts 20 and 22 in carrying out the method of the present invention, quantities of such nuts are initially slotted or sawed radially to provide a circumferential discontinuity or slot 24. When so slotted, pairs of nuts 20 and 22, hereinafter referred to as split nuts, are threadably disposed on the respective threaded portions 16 and 18 of rods 4 and 6 in a predetermined axially spaced relation. Each of the rods 4 and 6 are then slidably inserted into opposite ends of tubular member 26 of circular cross section to positions wherein the outer nut of each pair is equally spaced inwardly from the adjacent end of the tube. Prior to or simultaneous with insertion of rods 4 and 6 into tube 26, the latter is disposed within the coils of an electromagnetic deforming apparatus 28, which in a known manner develops a high flux density pulsed magnetic field to exert pressure uniformly and simultaneously over the wall of tubular member 26. The pressure so generated deforms the tube wall inwardly so that portions 30, 32, 34 and 36 contract into gripping engagement with the hexagonal outer periphery of nuts 20 and 22 (FIGURE 5), while the portions 38, 40, 42, 44, 46 and 48 thereof are displaced inwardly to form circumferential necked-in portions (FIGURE 2) serving to permanently secure the respective nuts against axial displacement within the tube. Due to the fact that each of the split nuts is formed with the discontinuity 24, the pressure exerted by the deformed portions 30, 32, 34 and 36 causes the nuts to be compressed circumferentially so that the internal threads thereof establish full thread conformity with the threaded portions 16 and 18 of rods 4 and 6 and consequently provide optimum precision threaded engagement. Additionally, by selection of a suitable energy level for the electromagnetic deforming device, any desired degree of pressure may be applied to the tube wall thereby enabling accurate control of the level of turning torque established between the nuts and respective rods. Further, since the energy level generated by the device is essentially uniform for each pulse operation, a high degree of uniformity in turning torque resistance is maintained between successive assemblies so manufactured.

Figure 4:
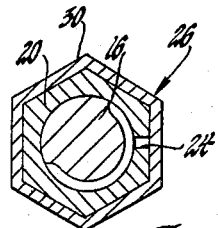
FIGURE 4 is a view similar to FIGURE 3 illustrating a modification of the invention.

FIGURE 4 illustrates a modification of the invention in which a tubular member 50 of hexagonal cross section is utilized. It will be appreciated that the choice of hexagonal stock tubing will not only reduce the degree of deformation required to effect compression engagement with the nuts, but also assures accurate angular alignment of the hexagonal outer surface of the nuts. However, in connection with the latter, is should be noted that utilization of tube material of circular cross section requires no particular angular alignment of the nuts. Selection of tube cross section in this regard will, therefore, depend upon the relative importance of angular alignment of the nuts versus axial spacing thereof.

While two embodiments of the invention have been shown and described, it will be apparent that other changes and modifications may be made therein. It is, therefore, to be understood that it is not intended to limit the invention to the embodiments shown.

I claim:

1. The method of making an adjuster assembly adapted for threadably connecting a pair of rods having threaded ends of opposite lead, comprising the steps of placing a pair of split nuts in axially spaced relation on each of said threaded ends, disposing the respective threaded ends into opposite ends of a tubular member, and exposing the entire length of the tubular member to a high flux density pulsed magnetic field operative to deform the tubular member into gripping engagement with said split nuts to produce a permanent resilient force acting to contract said nuts into full thread conformity with said threaded ends and to establish a predetermined turning torque sufficient to maintain said adjuster in assembled adjusted position.

2. The method of claim 1 wherein said nuts are formed from stock of polygonal cross section and said tubular member is initially preformed with a polygonal cross section dimensioned to slidably receive said split nut in relaxed condition.

3. The method of making an adjuster assembly comprising the steps of forming a pair of rods with threaded end portions of opposite lead, forming cooperating nuts with single circumferential discontinuities, placing a pair of said nuts in axially spaced relation on each of said threaded ends, disposing the respective threaded ends into opposite ends of a tubular member of circular cross section, and electromagnetically deforming the tubular member inwardly to contract said nuts into full thread conformity with said threaded ends and to establish a predetermined turning torque sufficient to maintain and adjuster in assembled adjusted position.

4. The method of making an adjuster assembly adapted for threadably connecting tie rod ends having threaded ends of opposite lead, comprising the steps of placing a pair of split nuts in axially spaced relation on each of said threaded ends, disposing the respective threaded ends into opposite ends of a tubular member having an inner surface conforming with the outer surface of said nuts, and electromagnetically deforming the tubular member into radial and axial gripping engagement with said split nuts to produce a permanent resilient force acting to contract said nuts into full thread conformity with said threaded ends and to establish a predetermined turning torque sufficient to maintain said adjuster in assembled adjusted position.

5. The method of making an adjuster assembly adapted for threadably connecting a tie rod and a tie rod end having threaded ends of opposite lead, comprising the steps of placing a pair of split nuts in axially spaced relation on each of said threaded ends, disposing the respective threaded ends into opposite ends of a tubular member of circular cross section, and electromagnetically deforming the tubular member so that the portions thereof radially adjacent said split nuts effect gripping engagement therewith sufficient to produce a permanent resilient force acting to contract said nuts into full thread conformity with said threaded ends and to establish a predetermined turning torque, while the portions of said tubular member axially adjacent said split nuts are formed with necked-in circumferential ribs effective to prevent axial movement of said nuts in said tubular portion.

References Cited

UNITED STATES PATENTS

| | | | |
|---|---|---|---|
| 1,711,598 | 7/1929 | Hardick | 287—60 |
| 1,876,720 | 9/1932 | Merrill | 29—175 |
| 2,976,907 | 3/1961 | Harvey et al. | |
| 3,214,511 | 10/1965 | Franklin. | |
| 3,239,930 | 3/1966 | Violleau | 29—516 |
| 3,303,560 | 2/1967 | Lansky et al. | |
| 3,313,536 | 4/1967 | Dutton et al. | |
| 3,438,115 | 4/1969 | Humphress et al. | 29—516 XR |
| 2,723,140 | 11/1955 | Graham | 287—62 |

FOREIGN PATENTS 733,343    7/1955    Great Britain.

CHARLIE T. MOON, Primary Examiner

U.S. Cl. X.R.

29—175, 437, 517; 287—60